Oct. 29, 1940.  D. B. BAKER ET AL  2,219,884
TRACTOR CONSTRUCTION
Filed Oct. 7, 1938   5 Sheets-Sheet 5

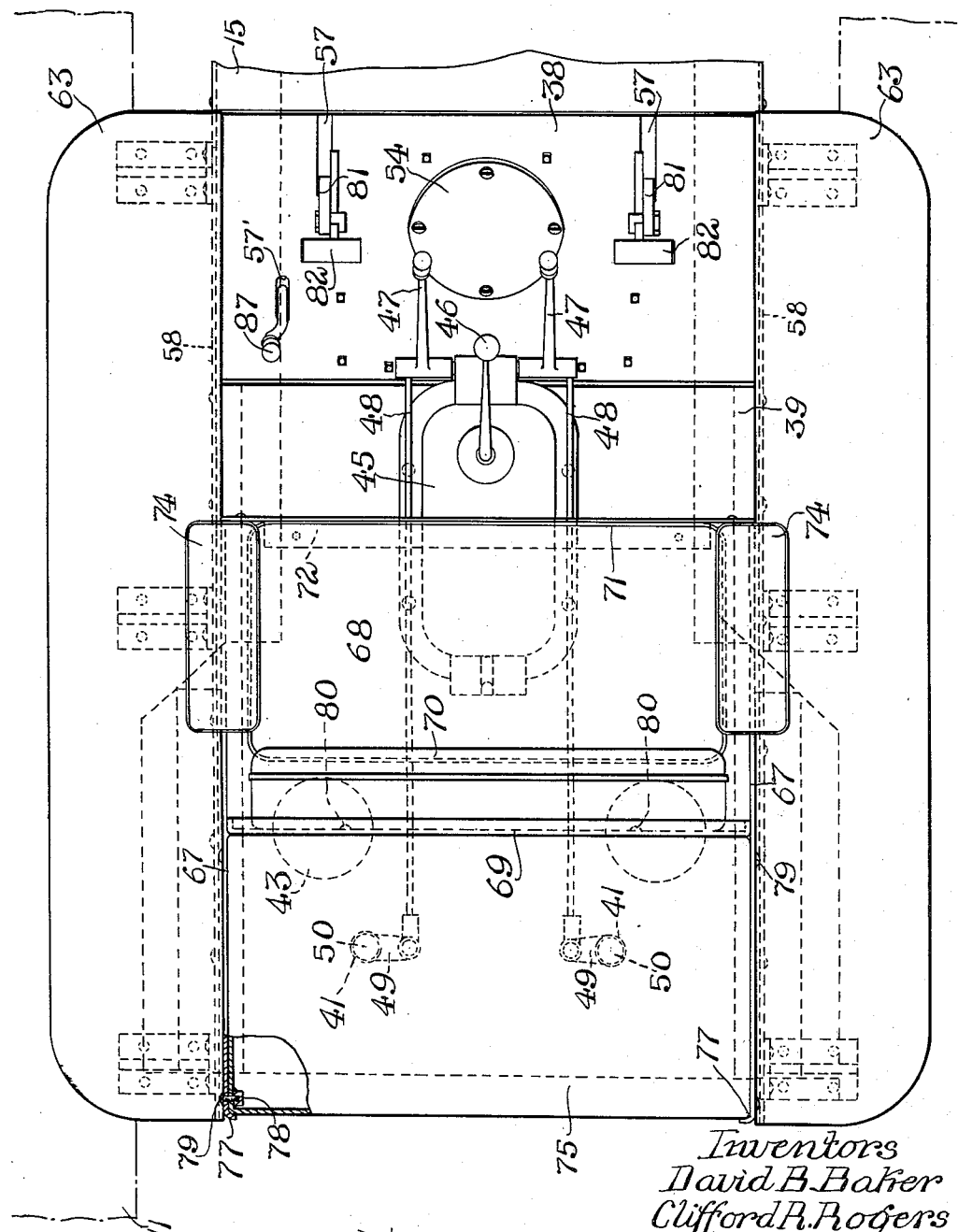

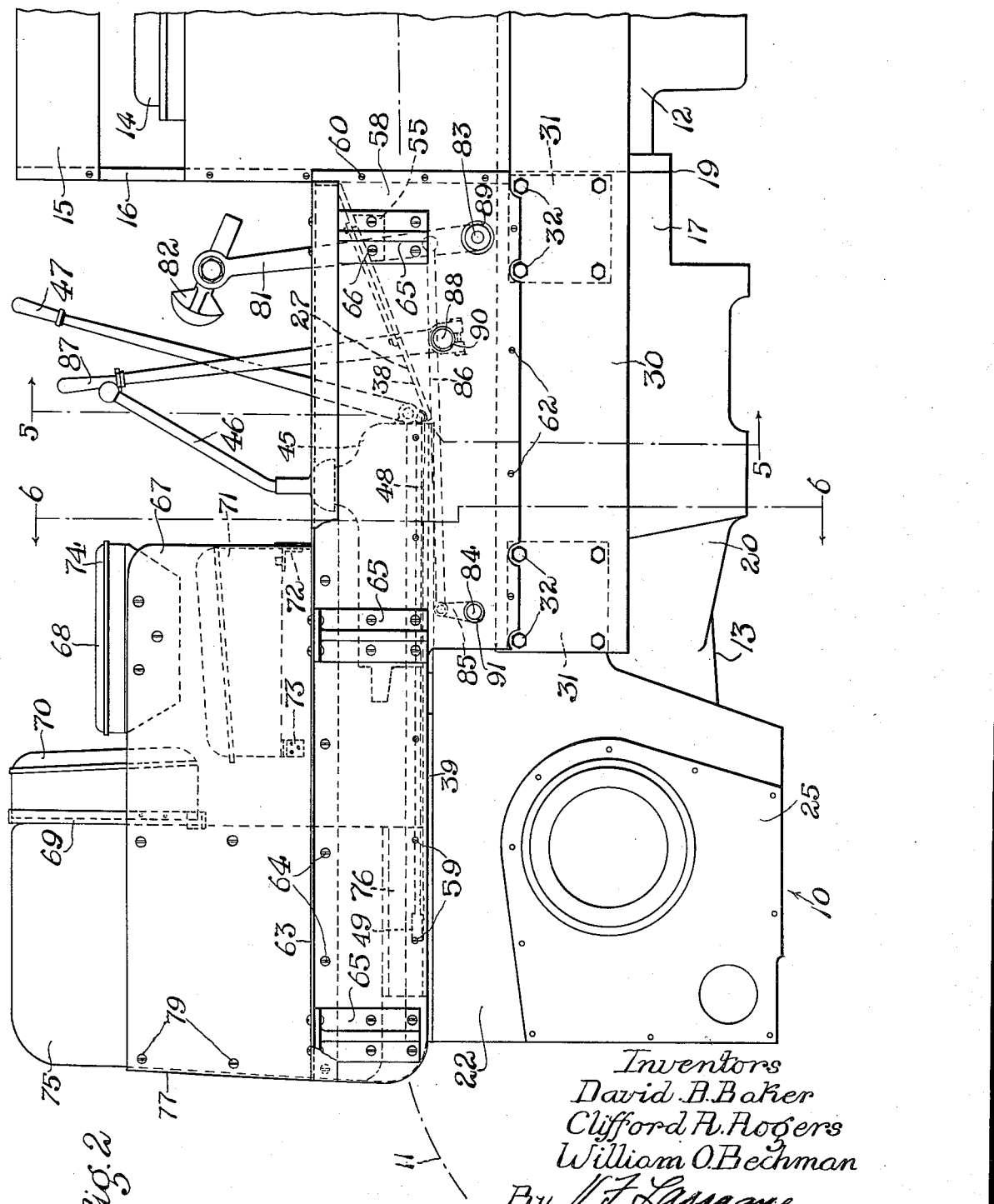

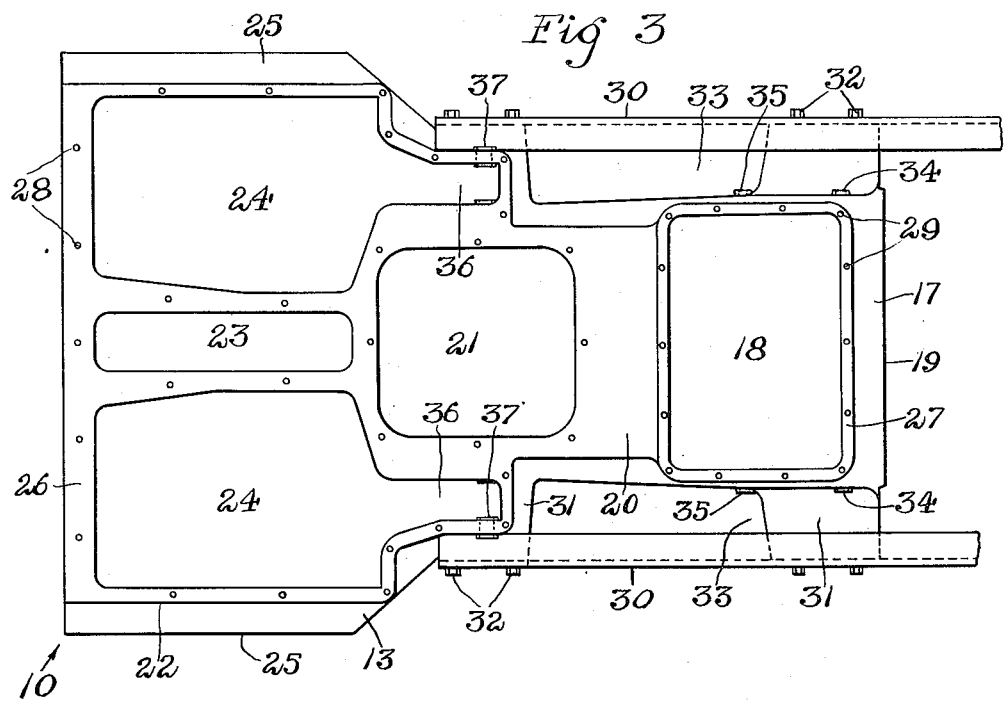
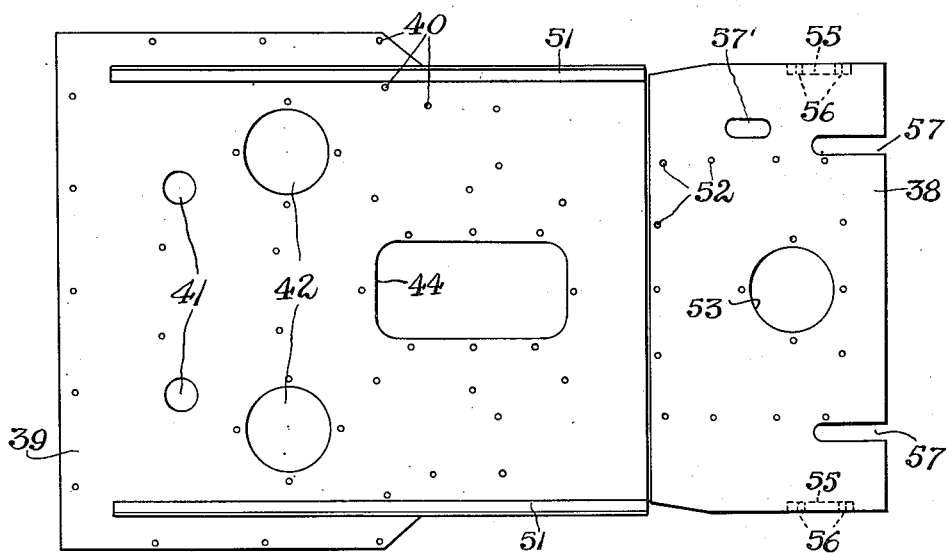
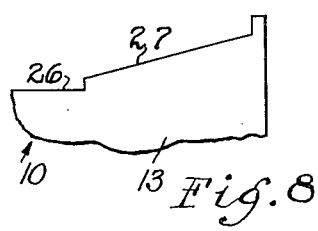

Inventors
David B. Baker
Clifford A. Rogers
William O. Bechman
By V. F. Lasagne
Atty.

Patented Oct. 29, 1940

2,219,884

UNITED STATES PATENT OFFICE 2,219,884

TRACTOR CONSTRUCTION

David B. Baker, Riverside, Clifford R. Rogers, Oak Park, and William O. Bechman, Chicago, Ill., assignors to International Harvester Company, a corporation of New Jersey Application October 7, 1938, Serial No. 233,758

16 Claims. (Cl. 180—1)

This invention relates to a tractor and more particularly to a body construction and superstructure therefor. Specifically, the invention relates to a tractor of the track-laying type, and while the features of the invention may be adapted to any type tractor, it is in the former that the advantages of the construction will be most recognized.

Ordinary construction of the track-type tractor provides for the disposition of a longitudinal main frame or body between a pair of self-laying tracks. The rear body part of the tractor is generally in the form of a one-piece casting provided with compartments in which are located various mechanisms necessary to the operation of the tractor. The size and shape of the compartments conform more or less to the type of mechanism used, and the entire size and shape of the rear body part is thus affected. For instance, the forward portion of the rear body part, containing the master clutch unit, is substantially circular and somewhat enlarged, while the portion directly rearwardly thereof containing the transmission mechanism is comparatively narrow, and the rearwardmost portion containing the final drive and steering mechanisms is considerably wider. Track-type tractors of ordinary construction generally include, additionally, covers for these compartments and these covers often include enlarged portions formed to accommodate certain upwardly projecting parts of the mechanisms. Since the operator's deck, which is included in the superstructure mounted above the body, is carried directly over this rear body part, these upwardly projecting portions of the compartment covers present an uneven floor space for the operator. This type of construction increases the difficulty of the operator in mounting and dismounting from the tractor and in efficiently operating the same. Another serious problem is presented in the production of the tractor since the irregular top of the rear body part does not afford opportunity for simplifying the superstructure thereabove. Consequently, certain parts of the superstructure must be formed to accommodate the peculiarities of the size and shape of the body. A still further problem is encountered in assembling and disassembling of the tractor, whether in manufacture or for repairs, because of the piecemeal removal of the superstructure parts. Additional problems, perhaps less serious than those previously mentioned, are those encountered in attempting to provide an operator's deck which is protected at each side from the respective self-laying tracks. Since the upper runs of the tracks are disposed at a height generally above the top of the body, it is likely that rocks and the like caught by the tracks will be thrown upwardly adjacent the operator's station, thus endangering the operator. While some form of protection has ordinarily been afforded the operator in the form of fenders or the like, these have not included fenders and side walls as component parts of the superstructure. In the particular tractor to which the present disclosure is directed, control means are carried by the rear body part at its narrow intermediate portion; that is, that portion containing the transmission mechanism. Since portions of the control means are located below the superstructure and between each side of the body and a respective track, it is important that portions of the structure be carried downwardly in order to protect these portions of the control means. It is further desirable that each of the above features be included without sacrificing one of the others and at the same time that a general design be incorporated in keeping with the trends of modern appearance. In order that these elements of design may be furthered, it is desirable that opposite side portions of the superstructure be generally parallel and substantially of uniform heights. In an improved construction, the operator's seat is located between the side portions of the superstructure and a fuel tank is disposed rearwardly of the seat and substantially at the same height as the back thereof. It is important that the fuel tank and the seat be readily removable from or with other portions of the superstructure.

The principal object of the invention, then, is to provide a generally improved rear body construction and superstructure therefor, particularly for a tractor of the tracklaying type.

An important object is to provide a rear body part provided with a plurality of compartments for housing the various mechanisms necessary to the operation of the tractor and at the same time to provide this body part with a substantially flat or level upper surface.

Another important object is to provide a superstructure for disposition above the rear body part, in which superstructure there is provided a platform which serves also to close the compartments in the rear body part, thus eliminating the number of irregularly shaped cover plates.

Another important object of the invention is to locate certain portions of certain control means at the side of a narrow portion of the body and to include in the superstructure portions substantially enclosing these portions of the control means.

Another object is to provide for the disposition of an operator's seat in the superstructure whereat the operator's seat is located between side portions of the superstructure, thus to enhance the appearance of the tractor and to afford a measure of protection to the operator.

Another object is to locate a fuel tank behind the seat and also within the side portions of the superstructure, the size and disposition of the fuel tank being carried out along the general lines of the tractor.

Still another object is to provide the platform with a plurality of small openings each covered by a removable cover plate for providing access to the various compartments for the purposes of inspection and adjustment of the operating mechanism.

Still another object is to provide the side portions and fenders of the superstructure in a manner permitting quick and easy detachment of the latter from the former to facilitate the use of the tractor in connection with bulldoser attachments and the like.

And still another object is to provide for the disposition of various operating and control means in such a manner that the operator's platform is substantially level and unobstructed.

Briefly and specifically, these and other desirable objects of the invention may be attained in one preferred embodiment of the invention by the provision of a track-type tractor having a longitudinal main frame including a one-piece rear body part. The rear body part is located rearwardly of and secured to a forward body part which includes the tractor engine. These parts are longitudinally arranged and are disposed between a pair of longitudinally running, parallel side frame members. The forward portion of the rear body part includes a compartment which houses the main or engine clutch unit; an intermediate portion of this body part includes a somewhat narrower compartment containing the transmission mechanism which is located in the housing rearwardly of the engine clutch; the rear portion of the rear body part is considerably wider and deeper, generally of a width equal to the spacing of the longitudinal side frame members, and includes compartments containing the bevel drive and steering mechanism. Since the intermediate portion of the rear body is narrowed, there is a space left at each side between the body and the respective side frame members. Control means are carried by the body and include portions disposed within these spaces and portions extending upwardly above the top of the body. A generally rectilinear superstructure is carried above the body and includes a substantially level platform secured to the top of the rear body part. This platform serves also to close the compartments in the body and its forward part includes openings to accommodate the upwardly extending portions of the control means. The superstructure further includes parallel side walls which extend above the platform to define a substantially rectangular operator's deck which includes at its rear and between the side walls an operator's seat and a fuel tank. Portions of the side walls extend below the platform and are secured respectively to the side frame members, thus substantially enclosing portions of the control means between the side frame members and the sides of the narrow portion of the body. The platform preferably comprises a forward and rearward part, the respective outer edges of each being disposed substantially along a longitudinal, straight line parallel to the longitudinal axis of the tractor. The side wall portions of the superstructure are secured to the platform parts along these edges. A longitudinal fender is secured to each side wall and overlies a respective self-laying track disposed at the side of the tractor main frame. These fenders may be removed for the purpose of providing more outboard space when bulldosers are used on the tractor. Various parts of the superstructure are rigidly secured together but each part may be separately removed or the entire superstructure may be removed as a unit.

A more complete understanding of the features and construction of the body and superstructure provided by the invention may be had from the following detailed description and the accompanying sheets of drawings from which there will also appear additional objects and advantages not previously set forth.

In the drawings,

Figure 1 is a plan view of the rear portion of a track-type tractor showing generally the disposition of the various elements of construction embodied in the improved body and superstructure;

Figure 2 is a side elevational view of the same;

Figure 3 is a plan view of the rear body part per se on a somewhat reduced scale;

Figure 4 is a general plan view of the two platform parts shown on the same scale as Figure 3;

Figure 8 is a view of a front portion of the rear body part, showing the relation between the upper surfaces thereof.

Figure 5:
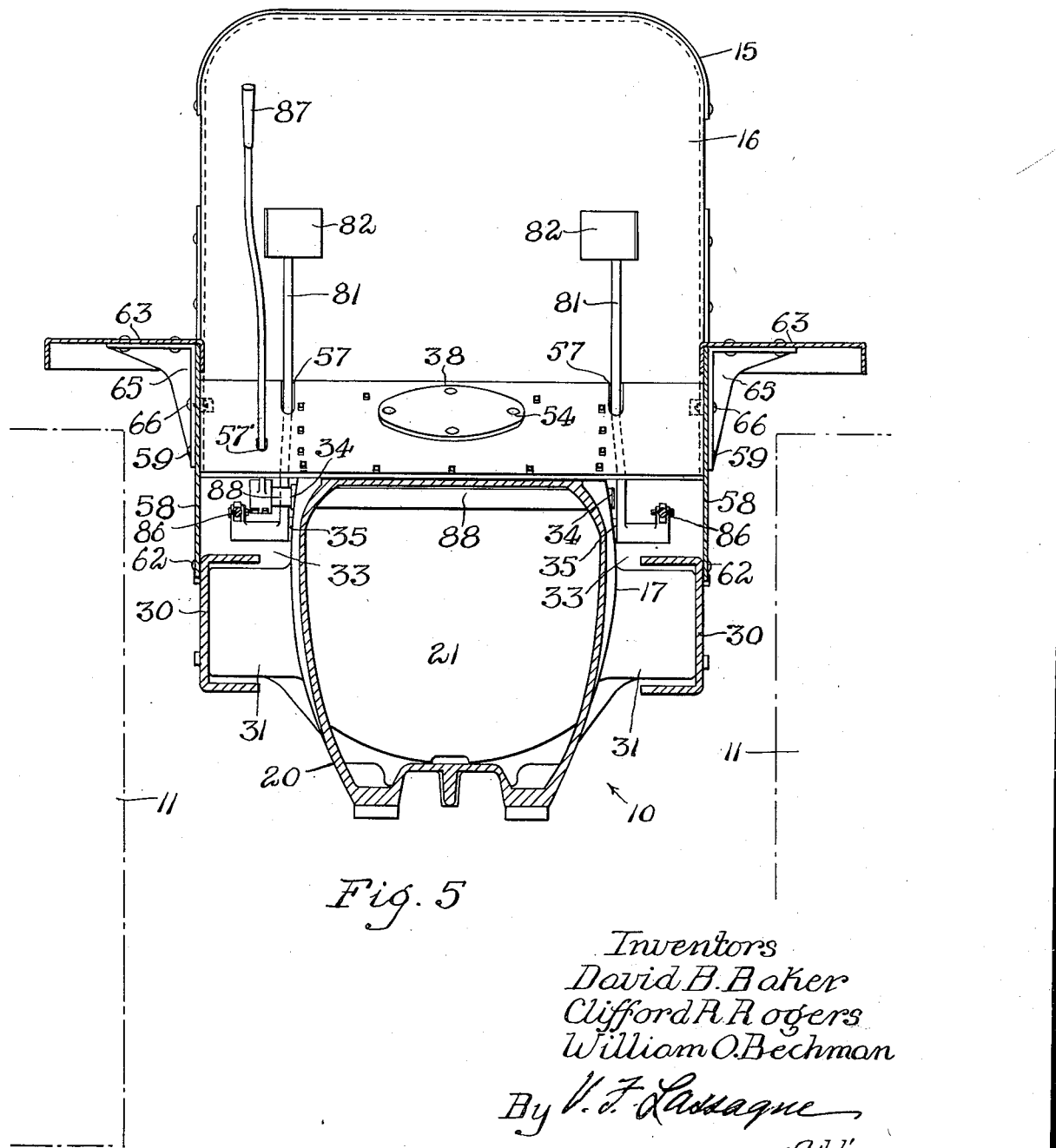
Figure 5 is a transverse sectional view taken substantially on the line 5—5 of Figure 2 showing generally the shape of a portion of the rear body and the forward portion of the superstructure thereabove.

The tractor chosen for purposes of illustration is of the track-laying type and comprises generally a longitudinal main frame or body 10 disposed between a pair of self-laying tracks, illustrated diagrammatically at 11. In the present disclosure of a preferred construction, the main frame consists of a forward body part 12 and a rear body part 13. The forward body part 12 forms no part of the present invention and a limited showing thereof is deemed sufficient to disclose its relation with the remainder of the tractor construction constituting the present invention. This forward body part carries the usual engine, only a rear portion of which is illustrated in Figure 2 at 14. An engine hood 15 of usual design is disposed above the engine and terminates at its rearward end in a dash panel 16. The dash panel is located substantially at the juncture between the forward and rear body parts and separates the superstructure from the forward portion of the tractor. The relationship between the dash panel 16 and the superstructure will be described in conjunction with the latter.

Looking especially to Figure 3 wherein there is illustrated the rear body construction per se, it will be seen that a forward portion 17 thereof is provided with a comparatively large compartment 18 for housing an ordinary master or engine clutch unit, not shown. The forward vertical surface of this portion is finished, as at 19, and is adapted to have secured thereto a rear portion of the forward body part 12 including the engine 14.

An intermediate portion 20 of the rear body part is centrally narrowed or reduced and includes a compartment 21 adapted to contain the usual transmission mechanism, not shown. A rearward portion 22 of the rear body is considerably wider than either of the portions 17 or 20, and is provided with a central compartment 23 adapted to contain bevel drive gearing, not shown, and with a pair of larger compartments 24 located respectively at each side of the central compartment 23 and adapted to contain the usual steering mechanism, also not shown, for the tractor. An outer surface 25 located at each side of the wider portion 22 of the body is provided for the purpose of securing thereto housing structures containing the usual pinions and bull gears for driving the final drive sprocket wheels, not shown, which in turn drive the self-laying tracks 11.

Each of the previously described compartments is open at its top, and substantially the entire upper or top surface of the rear body part 13 is level or flat, as at 26, except that portion of the surface surrounding the clutch compartment 18. This surface generally designated at 27 is inclined forwardly and upwardly from the compartment 21, which construction enlarges the forward portion of the compartment 18 to enable the compartment adequately to house the master or engine clutch. It will be seen from the illustration of the rear body part that each of the compartments is separated by walls from the other, the top portions of these walls terminating in the upper flat surface 26. This surface is provided with a plurality of tapped bores, as at 28, and the inclined surface 27 surrounding the clutch compartment 18 is provided with a plurality of similar bores 29, the purpose of which will later appear in connection with the description of the superstructure.

In order that a rigid, unitary main frame construction be provided, a pair of longitudinally running, substantially parallel side frame members 30 are respectively disposed along opposite sides of the forward and rear body parts. Each side of the rear body part is provided with a pair of integral, longitudinally spaced, laterally extending portions in the form of mounting pads 31, to which the respective side frame member 30 is secured by a plurality of bolts 32. The rearwardmost pads 31 are disposed in transverse alinement substantially at the side of the transmission compartment 21 located in the intermediate reduced portion 20 of the rear body part, and the forward pads are located in a similar manner with respect to the forward portion 17 of the rear body part. As especially shown in Figures 5 and 6, the side frame members are of channel construction, the mounting pads 31 fitting within the upper and lower horizontal flanges thereof. These frame members extend forwardly and the forward body part 12 may be similarly mounted with respect thereto.

It will be noted from an examination of Figure 3 that the size and shape of the rear body part 13 and the disposition of the side frame members 30 with respect thereto, provide or define a space, as at 33, between each side of the intermediate reduced portion 20 of the body part and a respective side frame member. Portions of the body adjacent these spaces are adapted to carry control means for operating certain portions of the driving mechanism. A pair of transversely alined bosses 34, each formed with a transverse bore, is located at the forward portion 17 of the rear body part and is adapted to carry a portion of control means, which will be later described, and longitudinally rearwardly thereof there is provided a second pair of transversely alined bores 35, each of which is formed with a transverse bore for supporting portions of additional control means which will also appear later. Each steering mechanism compartment 24 has a forwardly extending reduced housing part 36 at the forward end of which is disposed a pair of transversely alined bosses 37, each of which is formed with a transverse bore. These bosses and bores serve to carry additional portions of the control means and a more detailed description thereof will appear later in conjunction with the description of the superstructure and its relation to the control means mounted in the bores in the bosses 34 and 35.

The platform comprising a part of the superstructure will now be described. This platform is best shown in Figure 4 and is drawn to the same scale as the rear body part shown in Figure 3. A comparison of these two figures will enable one more easily to understand the relation between the platform and the rear body part. The platform comprises a forward part 38 and a rearward part 39, both parts being formed of flat heavy gauge sheet metal. The rear part 39 is formed with a plurality of small openings 40 which, when the part 39 is superimposed upon the rear body part 13, become alined with the tapped bores 28 in said body part. It will be noted that when the rear platform part 39 is placed on top of the rear body part 13, the compartments 21, 23 and 24 are closed, the part 39 being rigidly, yet removably, secured to the flat surface portion 26 surrounding these portions. The part 39 is formed with a pair of small openings 41 which are adapted to accommodate upwardly projecting parts of the respective mechanisms carried in the compartments 24. Forwardly of the small openings 41, the platform part 39 includes a pair of larger openings 42. These openings 42 are in alinement respectively with the steering mechanism compartments 24 and each is closed by a preferably flat, lightweight cover 43, best illustrated in dotted lines in Figure 1. Each cover plate 43 is readily removable from the respective opening 42 to permit access to the respective compartment 24 for inspection, adjustment and minor repairs to the steering mechanism therein without removing the entire platform part 39.

It will be noted from Figures 3 and 4 that the forward portion of the rear platform part 39 overlies the intermediate narrow portion 20 of the rear body part. A centrally disposed rectangular opening 44 is provided in the platform part 39 in its forward portion; and, when the part is secured to the rear body part, this opening becomes alined with the transmission compartment 21 of the rear body part. This opening is adapted to be closed by a cover in the form of a casting or housing 45, best shown in Figures 1 and 6. This housing has mounted thereon a plurality of control means including a gear shift lever 46 connected to the transmission and a pair of steering control levers 47 connected by links 48 to crank arms 49 carried on vertical throw-out shafts 50 for the respective steering mechanisms, not shown. These vertical shafts 50 extend upwardly from the steering mechanisms in the compartment 24 through the aforesaid openings 41 in the platform part 39. The mounting of the control means on the cover or housing 45 forms no part of the present invention except in so far as the cover closes the opening 44 in the platform part 39. It will be understood, of course, that any type cover or control means mounting may be utilized, that disclosed being preferably employed in conjunction with the embodiment of the invention disclosed herein.

A pair of longitudinally running parallel angle bars 51 are welded or otherwise secured respectively to opposite edge portions of the rear platform part 39. These angle bars 51 provide means for mounting other portions of the superstructure, as will hereinafter appear.

Figure 7:
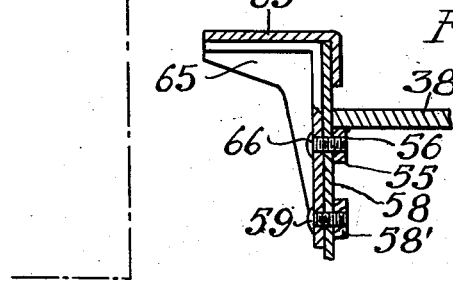
Figure 7 is an enlarged detail sectional view showing the manner in which a forward portion of the superstructure side wall and fender is secured to a forward portion of the platform.

The forward platform part 38 is provided with a plurality of small openings 52 which, when the part is placed on the inclined surface 27 of the forward portion 17 of the rear body part, become alined with the threaded bores 29 therein and cap screws are passed therethrough. The central portion of the platform 38 is imperforate except for a circular opening 53 and thereby closes the engine clutch compartment 18. The opening 53 is closed by a preferably flat, light-weight cover 54 which may be readily removed to permit access to the compartment 18 for inspection and adjustment of the engine clutch, not shown, carried therein. Since the platform part 38 is considerably wider than the forward portion 17 of the rear body part 13, opposite side portions thereof extend laterally beyond opposite side portions of the body portion 17, each side edge of the part 38 being substantially in vertical alinement with the respective side frame member 30, thus overlying the aforesaid spaces 33 between opposite sides of the body and the respective side frame members. It will be noted that this platform part closes only the compartment 18 and may be readily removed therefrom without disturbing the rear platform part 39. Each opposite edge portion of the part 38 has secured thereto, preferably by a welding, a depending ear portion 55, as best shown in Figures 4 and 7, each ear portion being provided with a pair of threaded bores 56, thus providing means for mounting certain portions of the structure as will appear later. The forward platform part is further provided with a pair of openings or slots 57 and a third opening 57' adapted to accommodate certain portions of control means, a description of which will also appear later.

The position of the parts 38 and 39 illustrated in Figure 4 is, of course, the position said parts will assume when secured to the upper flat surfaces 27 and 26, respectively, of the rear body part. It will be noted that these parts are disposed edge to edge and are substantially of the same width, forward portions of the rear platform part 39 extending laterally over the aforesaid space 33 and cooperating with rearward portions of the forward platform part 38.

Figure 6:
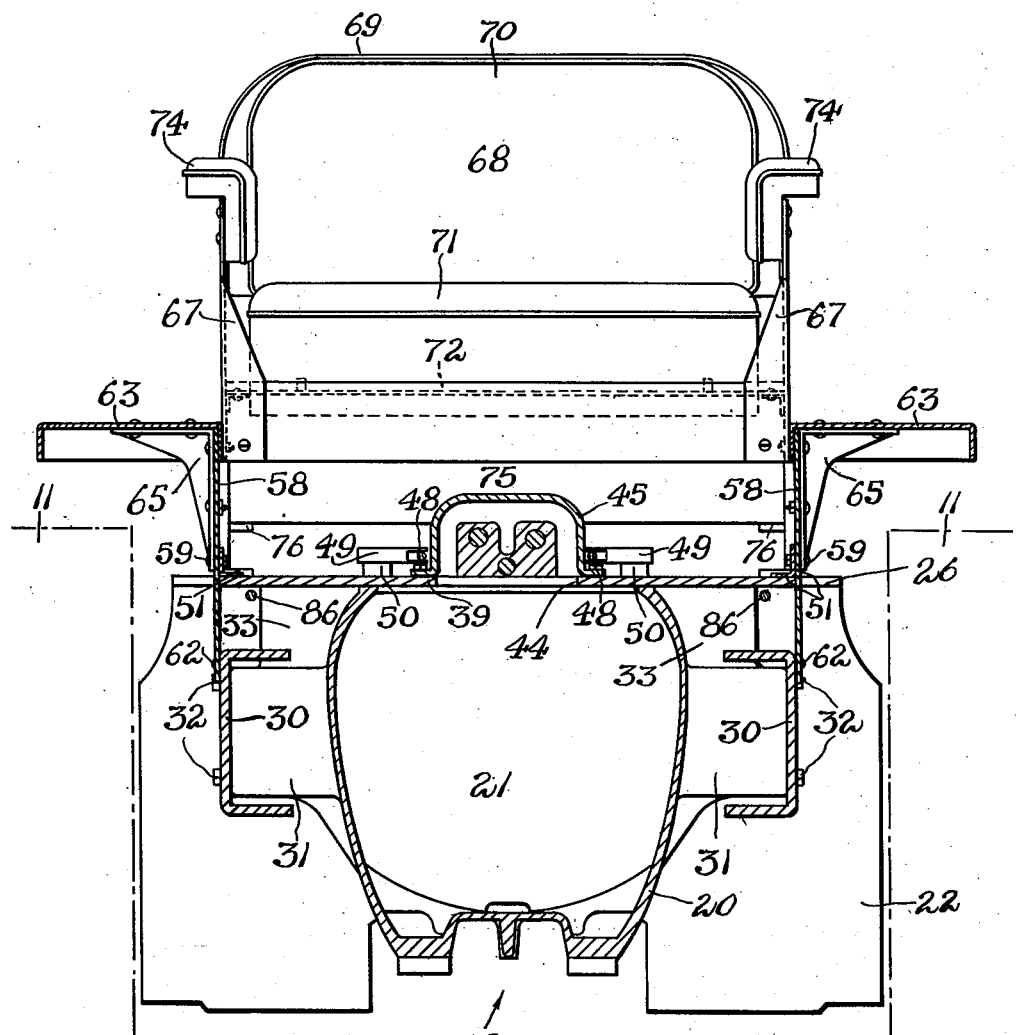
Figure 6 is a transverse sectional view taken substantially on the line 6—6 of Figure 2 showing the relation between the rear portions of the body and superstructure.

The following description will pertain to the superstructure and the relation of its component parts to the platform parts and to the main frame of the tractor. A longitudinal vertical sheet metal side wall or sheet 58, as best shown in Figures 2, 5 and 6, is disposed along each side of the rear body part 13. An intermediate portion of each sheet 58 is secured to the respective angle iron 51, carried by the rear platform part 39, by removable cap screws or the like 59, each angle iron 51 being formed with a plurality of threaded bores to receive the securing means. Each side sheet 58 extends longitudinally of the body and is secured adjacent its forward vertical edge, as at 60, to the respective side portion of the dash panel 16. The sheets 58 extend through out their lengths to a height above both platform parts 38 and 39 and the upper edge thereof is substantially horizontal. The forward portion of each sheet is in the form of a drop portion which extends vertically below the platform and terminates in a lower substantially horizontal edge, the sheet being secured along this edge to the respective side frame member 30, as at 62. The rearward portion of each sheet terminates in a lower edge disposed at a height above that of the lower edge of the forward drop portion and lies along the upper flat surface of the rear side portion of the rear platform part 39. As best shown in either Figures 5 or 6, the forward drop portions of the side sheets 58 cooperate with the laterally extending portions of the platform parts 38 and 39 and with the side frame members 30 to substantially enclose the aforesaid spaces 33, the purpose of which will appear later with the description of the control means.

Each side sheet 58 has secured thereto along its upper horizontal edge a longitudinally running horizontal fender 63, which extends laterally outwardly and overlies a portion of a respective self-laying track, the respective side sheet 58 providing a drop portion between the self-laying track and the side of the body. The longitudinal extent of each fender is substantially from the dash panel 16 to the rear end of the side sheet 58. Figure 2 illustrates in side elevation a portion of the fender broken away to show the manner in which it may be secured to the side sheet 58, as at 64. These securing means may be in the form of cap screws, or the like, similar to those at 59, as also may be those at 60 and 62, to permit easy assembly and disassembly of the parts, which is an important feature of the present invention. Each fender is further supported by a plurality of bracket members 65 which serve to strengthen the fenders to permit the use thereof for mounting auxiliaries for the tractor such as batteries, lighting equipment or the like and also to permit the fenders to be used as steps by the operator in mounting and dismounting from the tractor. The lower portions of each bracket are secured through the side sheets to the respective angle irons 51 by certain of the cap screws 59. An intermediate portion of each forwardmost bracket is secured through the respective side sheet 58 to the depending ear 55, which is rigidly carried by a respective side portion of the forward platform part 38, a pair of cap screws 66 being threaded into the tapped bores 56 in the ear. A detailed illustration of this construction is shown in a somewhat enlarged fragmentary view in Figure 7. It will be noted also that the side sheet further rigidly carries a portion 58' provided with tapped bores which receive additional cap screws or the like. This provision is important and may be employed in various parts of the superstructure since the walls, or sheets, are of light weight sheet metal and would otherwise require riveting or bolts and nuts or the like.

A second pair of longitudinal side sheets or walls 67 is also provided and comprises part of the improved superstructure. Each wall 67 is secured along a lower horizontal edge to the upper horizontal edge of the respective side sheet 58 and extends vertically thereabove, terminating in an upper substantially horizontal edge. These two parts of the side wall structure are secured together by the bolts 64 which serve as securing means for the respective fender 63. It will be understood, of course, that the side wall parts 67 may be made integral with the side sheets 58. Each side wall 67 extends from an intermediate portion of the structure substantially at the intermediate narrow portion 20 of the rear body part 13 to the rear end thereof and provides side walls for an operator's seat generally designated by the numeral 68.

The operator's seat comprises a transverse back wall or member 69 which is secured respectively at opposite edges to the side walls 67. A back cushion 70 is removably secured to the transverse part 69 in any suitable manner. A seat cushion 71 is removably associated between the side walls 67, being supported at its forward end by a transversely extending angle bar 72 rigidly secured at its opposite ends to the walls 67, and at its rear end on a similar support 73. The type of seat construction is relatively unimportant in connection with the invention except in so far as its location and the removability feature of its parts are concerned. The seat construction is completed by the provision of arm rests 74 secured respectively to the side walls 67.

It will be noted that the location of the seat back cushion 70 and the removable seat cushion 71 is substantially above the removable cover plates 43 which close the openings 42 in the platform part 39. The removability of the cushions permits access to the cover plates 43 without disturbing other portions of the superstructure. It will be further noted that removal of the seat cushion alone permits access to the securing means between the cover or housing 45 and the platform part 39 to permit easy removal of the cover from the platform part to permit access through the opening 44 to the transmission compartment 21.

From an examination of Figures 1 and 2, it will be seen that the side walls 58 and 67 extend rearwardly of the seat 68 and are adapted to co-operate in supporting a fuel tank 75 at the rear of the tractor. The fuel tank, the seat back portion 69 and the back cushion 70 extend upwardly to a height substantially equal to the height of the forward engine hood 15, thus carrying out the general lines of the tractor. The lower portion of the fuel tank extends somewhat below the upper edges of the side sheets 58 and rests on a pair of laterally spaced support members in the form of channel bars 76, best shown in Figures 2 and 6. As best shown in Figure 1, wherein a portion of the fuel tank is broken away to show more clearly the manner in which it is secured to the side wall 67, each side wall is curved at its rearward edge around the rearward corner 77 of the fuel tank, as at 77. During the manufacture of the fuel tank and before it is sealed, securing members 78, only one of which is shown, are welded to the inner surfaces of the walls thereof and are provided with tapped bores which communicate with openings in the walls of the tank. It will be noted that these tapped bores are "blind" to prevent leakage of fuel from the tank. The tank, then, is secured between the side walls 67 by means of a plurality of cap screws 79 threaded into the tapped bores of a plurality of the members 78. The forward wall of the fuel tank may be similarly secured to the back portion 69 of the sheet, as at 80, or may even serve as the back portion. The bottom portion of the tank may be similarly secured to the support members 76.

As hereinbefore mentioned, opposite sides of the rear body part are adapted to support the control means. One control means at one side of the body comprises an upwardly extending brake lever part 81 which carries at its upper end a brake pedal 82 within easy reach of the operator's seat 68. The lower part of the brake lever is carried on a transverse shaft 83 mounted in the transverse bores formed in the transversely alined bosses 34 provided at opposite sides of the forward portion 17 of the rear body part. A similar brake lever construction is mounted at the other side of the body and on the other end of the transverse shaft 83, the brake levers 81 extending respectively upwardly through the slots or openings 57 in the forward platform part 38. Each pair of transversely alined bosses 37 in the rearward portion 22 of the body part carries in the transverse bores thereof a transverse stub shaft 84, best shown in Figure 2, on which is mounted for movement therewith an upwardly extending arm 85 in turn connected by an operating link 86 to the respective brake lever 81. The inner parts of the brake operating mechanism are located in the forward compartment parts 36 of the steering mechanism compartments 24 and are not shown as they form no part of the present invention. The forward portion 17 of the body part 13 carries at its left side a main or engine clutch control 87. This lever is mounted at its lower end on a transverse shaft 88 carried in the transverse bores formed in the transversely alined bosses 35 provided at the side walls of the forward portion of the body part. This shaft is connected in any suitable manner with the engine clutch, not shown. The lever 87 extends upwardly through the opening 57' formed in the forward platform part 38 and is disposed within easy reach of the operator's seat 68.

As previously described, the laterally extending side portions of the platform parts 38 and 39 cooperate respectively with the side sheets 58 and the side frame members 30 substantially to enclose the aforesaid spaces 33. It will be seen, as best shown in Figures 5 and 6, that the lower and outer portions of the control means, including the brake levers 81 and the clutch lever 87, are located respectively entirely within these spaces.

As best shown in Figure 2, each side wall 58 is provided with a pair of openings 89 and 90 disposed respectively in transverse alinement with the transverse shafts 83 and 88. This provision permits removal of these shafts transversely through the respective openings without removing side sheets 58. Lubrication of the shafts is also permitted through these openings. Similar openings 91 are provided for similar purposes in the side sheets 58 in transverse alinement with the transverse shafts 84.

In assembling and disassembling the construction at the rear of the tractor, the entire superstructure may be installed or removed as a unit.

In removing the superstructure from the rear body part 13, it is necessary only to remove the bolts or cap screws securing the platform parts 38 and 39 to the upper surfaces 27 and 26 of the body part, the cap screws 60 securing the side sheets 58 to the dash panel 16 and the cap screws 62 securing the side sheets to the side frame members 30. Thus, the entire superstructure may be moved upwardly from the rear body part, it being necessary also to remove the brake pedals 82, thus exposing the compartments 18, 21, 23 and 24 in the rear body part. In numerous instances, however, it may not be necessary to remove the entire superstructure; for example, when it is desirable to obtain access to only one of the compartments in the rear body part. To obtain access to the engine clutch compartment 18 for inspection or adjustment, it is necessary only to remove the cover plate 54 closing the opening 53 in the forward platform part 38. But should it become necessary to uncover the entire compartment for removal of or major repairs to the engine clutch, the entire forward platform part 38 may be easily and readily removed without removing other parts of the superstructure. Removal of this part may be accomplished by removing the cap screws or bolts 66 between the side sheets 58 and the ear portions 55 on the platform part 38, and by removing the bolts that secure the platform part to the inclined surface 27. It will be noted that removal of the part 38 also exposes the lower portions of the forward control means including the levers 81 and 87 carried on the shafts 83 and 88, respectively. Removal of either of these shafts is permitted, as previously mentioned, through the openings 89 and 90 respectively. Since the fender brackets are secured at their upper horizontal flanges to the fenders 63, they will remain in position during the removal of the forward platform part 38.

Access to the transmission compartment 21 is obtained first by removing the seat cushion 71 and then by removing the cover or casting 45 on which are carried the control levers 46 and 47. The control links 48 connected to the levers 47 may be easily removed therefrom.

As previously mentioned, access to the compartments 24 for inspection or minor adjustments may be had by removing the cover plates 43 secured over the openings 42 in the platform part 39. In the event that it becomes necessary to expose the compartment 24 entirely, the rear platform part 39 and certain parts of the superstructure attached thereto may be readily removed without removing the forward platform part 38. It will be apparent that the foregoing procedures may be followed in reverse order in reassembling the component parts of the rear construction of the tractor. It will also be apparent that certain of the procedures may be varied by removing certain other parts or permitting the same to remain attached to others.

From an examination of Figures 3 and 4, it will be seen that the only perforate parts of the platform are those laterally extending parts of the forward platform part 38 in which are provided the openings 57 and 57'. It will be noted that these parts are located laterally outwardly of the forward portion 17 of the body part containing the compartment 18, and that the compartment 18 is securely closed by the imperforate central part. The remaining openings 41, 42, 44 and 53 are adequately closed, as previously described. Thus, it will be seen that the two platform parts serve to close the compartments in the rear body part, thus preventing the entrance of dirt or the like and the escape of lubricant therefrom. These platform parts, being substantially flat or level, provide a clear unobstructed floor for the operator's deck or station which is defined by the side sheets or walls 58 and 67 and the operator's seat and fuel tank 68 and 75, respectively. The entire operator's deck is delineated at its sides by the fenders 63 which cooperate with the side sheets 58 to protect the operator against stones or the like that may be caught and thrown upwardly by the self-laying tracks 11. The lower forward portions of the side sheets 58 protect the lower portions of the forward control means including the transverse shafts 83 and 88 and the lower parts of the levers 81 and 87, respectively, carried thereon, and also the rearwardly extending links 86 connected respectively to the arms 85 carried on the shafts 84.

An additional feature of the construction is that the superstructure defines a substantially rectilinear operator's deck which is in keeping with modern design and which results in a pleasing appearance without sacrificing desirable elements of construction.

The foregoing description pertains, of course, to only one preferred embodiment of the invention and it will be understood that with slight modifications and alterations the superstructure may be adapted to tractors with rear body construction different from that specifically disclosed. It will further be understood that certain changes, as desired, may be made in the superstructure per se or parts thereof, or that various other alterations and modifications may be made in the construction without departing from the spirit and scope of the appended claims.

What is claimed is:

1. In a tractor having a main frame, the combination of a body part included at the rear of the main frame and having a substantially flat top, said body including an open-top compartment, a control means carried by the body and including a part extending upwardly past the top of the body, and a superstructure carried on the body, said structure including a substantially level platform secured to the flat top of the body, a forward portion of the platform extending laterally at one side of the body and having an opening therein to accommodate the upwardly extending part of the control means, an operator's seat disposed above the platform rearwardly of the control means, and a vertical side sheet disposed longitudinally at each side of the body and seat and secured to respective outer portions of the platform and to the seat, said sheet extending vertically above the platform to define an operator's deck, the sheet at one side extending below the platform alongside the control means.

2. In a tractor having a main frame carried between a pair of ground supports, the combination of a body part included at the rear of the frame and having a substantially flat top, opposite sides of the body being spaced laterally inwardly of the respective ground supports, a control means carried by the body at one side and below the top thereof, said means including a part extending upwardly past the top of the body, and a superstructure carried on the body, said structure comprising a substantially level platform of uniform width secured to the flat top of the body and having a portion extending laterally over the control means and formed with an opening to accommodate the upwardly extending part, a pair of parallel fenders disposed respectively at the sides of the body above the platform and overlying respective ground supports, each fender including a drop portion disposed between the body and the ground support and secured to the platform, one drop portion further extending downwardly alongside the control means to substantially enclose said control means, and an operator's seat disposed above the platform between the fenders and rearwardly of the extending part of the control means, opposite side portions of the seat being secured to respective fender drop portions.

3. In a tractor having a main frame, the combination of a body part included at the rear of the frame and having a substantially flat top, said body being formed with a plurality of open-top compartments, and a superstructure disposed longitudinally on the body, said structure including a substantially level uniformly wide platform secured to the top of the body and closing the compartments, said platform including a plurality of openings smaller than and in alinement with respective compartments and closed by removable cover elements, a pair of parallel side sheets disposed along the sides of the body and secured respectively to edge portions of the platform, said sheets extending vertically above the platform, and an operator's seat disposed at the rear of the platform between and having opposite portions respectively secured to the side sheets, the seat and the side sheets defining a substantially rectangular operator's deck above the body, said seat being located over a cover element for one of the compartments and including a removable cushion for providing access to said cover element.

4. In a tractor having a main frame, the combination of a body part included at the rear of the frame and formed with a flat top and a plurality of open-top compartments, said body having a central reduced forward portion including at least one of the compartments, and a superstructure carried on the body and including a two-part level platform secured to the top of the body, the forward part separately closing the compartment in the reduced portion and the rearward part closing the compartments in the rear portion, a pair of vertical side sheets disposed longitudinally alongside each side of the platform and secured to the respective outer edges of each part thereof, an operator's seat located between the side sheets and solely over the rear platform part, and portions of the seat at each side being secured respectively to the side sheets.

5. In a tractor having a main frame, the combination of a body part included at the rear of the frame, said body comprising a rear portion formed with a flat top and including an open-top compartment and a reduced forward portion formed with a forwardly and upwardly inclined top and including an open-top compartment and a superstructure carried on the body and including a level platform secured to the top of the rear body portion and closing the compartment therein and a flat floor part secured to the inclined top of the reduced forward body portion and enclosing the compartment therein, the platform and the inclined floor part being of substantially the same width, a pair of vertical, longitudinally disposed side sheets secured respectively at each side of the platform and floor parts and extending vertically thereabove to delineate a substantially rectilinear operator's deck, and an operator's seat disposed solely over the platform part between and secured to the side sheets.

6. In a tractor, the combination of a body part carried between a pair of ground supports, each ground support being spaced laterally from the respective side of said body, the body having control means mounted on the body at one side, said means including a transverse shaft carried by the body and a portion extending above the body, and a superstructure carried on the body and comprising a substantially level platform secured to the body and having a portion extending laterally beyond one side of the body and overlying the control means, said portion having an opening therein for accommodating the extending portion of said means, a pair of side sheets disposed longitudinally between the sides of the body and respective ground supports, said sheets extending substantially vertically above and below the platform and secured thereto, the lower portion of one side sheet and the aforesaid portion of the platform substantially enclosing the control means, said sheet being formed with an opening in transverse alinement with the control means shaft, and an operator's seat disposed above the platform rearwardly of the control means, and between and secured to the upper portion of the side sheets.

7. A superstructure for a track-type tractor having a body carried between a pair of self-laying tracks and having a control means mounted respectively at each side thereof inwardly of the respective track, said structure comprising a substantially level platform carried on the body and having openings in alinement with the control means, an operator's seat disposed on the platform rearwardly of the control means, and a pair of side sheets disposed longitudinally at each side of and secured to the platform and seat, each side sheet extending vertically above the platform and including a fender extending laterally over a respective track, the upper portions of the sheets defining a walled operator's deck between the tracks, said side sheets further including drop portions extending downwardly below the platform alongside the aforesaid control means for defining a protected space for housing said means.

8. In a track-type tractor, the combination of a longitudinal body carried between a pair of self-laying tracks and including a transverse dash panel intermediate its ends, and a superstructure carried on the body rearwardly of the dash panel, said structure comprising a pair of spaced, parallel side sheets disposed at opposite sides of the body and extending rearwardly from the dash panel to the rear end of the body, each sheet having a horizontal upper edge, a longitudinally running fender secured to each sheet along its upper edge and overlying a respective track, a substantially level platform secured to the body between the side sheets and below their upper edges, said platform having portions secured to the side sheets, an operator's seat disposed forwardly of the rear end of the body between the side sheets and including vertical side walls secured respectively to the sheets and extending thereabove, said walls terminating at their rear ends in alinement with the side sheets, and a fuel tank disposed behind the seat between and secured to the side walls, the rear portion of said tank being coterminous with the seat side walls, said structure defining a longitudinal operator's deck of substantially uniform width.

9. A superstructure for a track-type tractor having a longitudinal body carried between a pair of self-laying tracks and having a dash panel intermediate its ends, said structure including a substantially rectangular, level platform secured to the top of the body rearwardly of the dash panel, an operator's seat at the rear end of and above the platform and a pair of parallel side wall elements secured respectively at opposite sides of the platform and extending vertically thereabove substantially throughout the length thereof, said wall elements extending further upwardly at their rear portions to provide sides for the seat, each wall further including a longitudinal running horizontal fender portion disposed at a height above the platform and overlying a track.

10. A superstructure for a track-type tractor having a longitudinal body carried between a pair of self-laying tracks and including a wider rear portion and a central narrow portion, said structure including a substantially rectangular, level platform secured to the top of the body, an operator's seat at the rear end of and above the platform over the wider body portion, and a pair of parallel side wall elements disposed along and secured respectively to opposite sides of the platform, each wall throughout its length extending vertically above the platform and including a lower forward portion extending alongside the narrow body portion and a higher rear portion extending alongside the seat and secured thereto.

11. A superstructure for a track-type tractor having a longitudinal body carried between a pair of self-laying tracks and having a dash panel intermediate its ends, said structure including a substantially rectangular, level platform secured to the top of the body rearwardly of the dash panel, an operator's seat at the rear end of and above the platform, a pair of parallel side wall elements disposed longitudinally along and secured respectively to opposite sides of the platform, each side wall extending vertically upward and having an upper substantially horizontal edge disposed at a height above the platform, and a second pair of wall elements secured respectively to the first walls along a rear portion of said upper edge of each, said second walls extending rearwardly and serving as sides of and secured to the seat.

12. A superstructure for a track-type tractor having a longitudinal body carried between a pair of self-laying tracks and having a dash panel intermediate its ends, said structure including a substantially rectangular, level platform secured to the top of the body rearwardly of the dash panel, an operator's seat at the rear end of and above the platform, a pair of parallel side wall elements disposed longitudinally along and secured respectively to opposite sides of the platform, each side wall extending vertically upward and having an upper substantially horizontal edge disposed at a height above the platform, and a second pair of wall elements secured respectively to the first walls along a rear portion of said upper edge of each, said second walls extending rearwardly and serving as sides of and secured to said second walls extending rearwardly of the seat, and a fuel tank disposed behind the seat between and secured to the rearward extensions of said second walls.

13. A superstructure for a track-type tractor having a longitudinal body carried between a pair of self-laying tracks, the body being of a substantial uniform width along a lower portion and narrowed centrally along an upper portion, said structure comprising a substantially rectangular level platform secured to the top of the body and being of a width substantially that of the lower body portion and thereby extending laterally at each side of the upper body portion, an operator's seat disposed at the rear of the body within the outer edges of the platform, and a pair of side sheets disposed longitudinally along and secured to the platform, each sheet having an upper longitudinal portion extending vertically to a height above the platform and overlying the respective side of the seat, each sheet further including a lower portion extending downwardly alongside the narrowed body portion and secured thereat to the lower body portion.

14. An operator's deck for a track-type tractor having a body carried between a pair of self-laying tracks and including a rear body part formed with a pair of longitudinally arranged open-top compartments, said deck including a pair of substantially flat platform parts secured to the top of the body and respectively closing the compartments, said parts having substantially straight outer edges disposed respectively in substantially longitudinal alinement, a pair of longitudinal side sheets secured to the platform parts respectively along said edges and including longitudinal fender portions respectively overlying the tracks, each sheet throughout its length extending vertically above both platform parts, and an operator's seat located over the rearward platform part between and secured to the side sheets.

15. In a tractor having a main frame carried between a pair of ground supports, the combination of a body part included at the rear of the frame and having a substantially flat top, said body part including a central reduced forward portion, a pair of spaced frame members secured respectively at opposite sides of the body, each member being laterally spaced with respect to a side of the reduced body portion, a pair of control means located respectively at each side of the reduced portion and carried thereby inwardly of the frame members, each means including a part extending upwardly past the top of the body, and a superstructure carried on the body comprising a substantially level platform secured to the body and extending laterally at each side of the reduced portion, the outer edges of the platform being substantially in vertical alinement with the frame members and including openings accommodating the upwardly extending parts of the control means, an operator's seat disposed above the platform and having its opposite side portions located respectively between the outer edges of the platform, a vertical side sheet disposed longitudinally at each side of the body and extending above and below the platform between the body and a ground support, each sheet being secured at its lower edge to a frame member and at an intermediate portion to the platform, that portion of each sheet between the platform and each frame member substantially enclosing the control means, and the seat and those portions of the sheet above the platform defining an operator's deck above the body and between the ground supports.

16. In a tractor, the combination of a body carried between a pair of ground supports and formed with a centrally disposed, narrowed forward portion having an open-top compartment surrounded by an upwardly and forwardly inclined top surface, a pair of fenders disposed respectively at each side of the body and overlying respective ground supports and spaced laterally from opposite sides of the narrowed portion, and an operator's deck carried on the body, said deck including a platform part secured to the body between the fenders and rearwardly of the aforesaid compartment, and a second platform part secured to the aforesaid inclined surface and being wider than the narrowed portion, said part serving to close the compartments and being secured at its wider portions to the fenders.

DAVID B. BAKER.
CLIFFORD R. ROGERS.
WILLIAM O. BECHMAN.